Sept. 13, 1949.  C. W. STRATFORD ET AL  2,481,888
SHROUDED ROTARY SEAL
Filed June 10, 1944
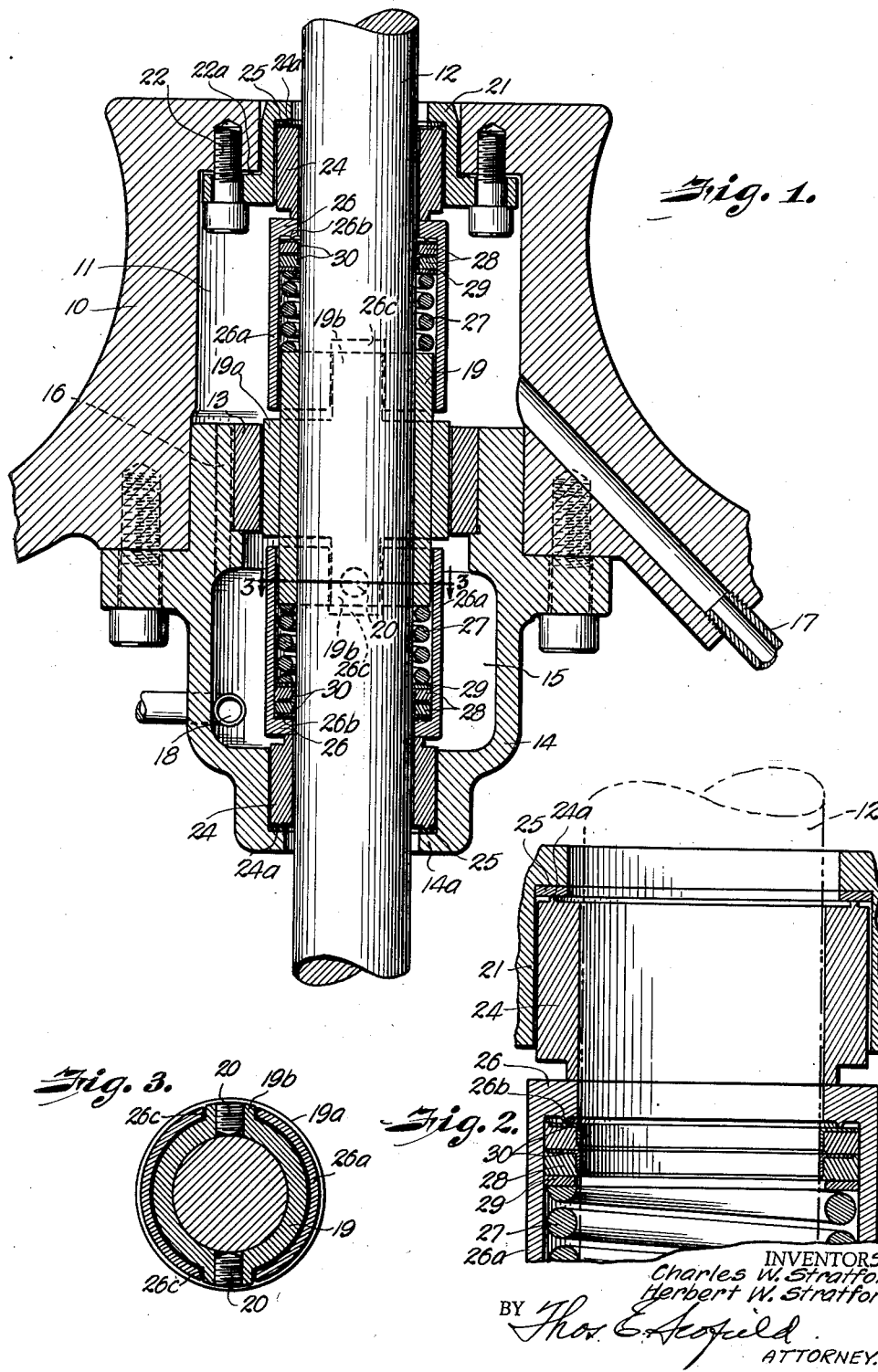
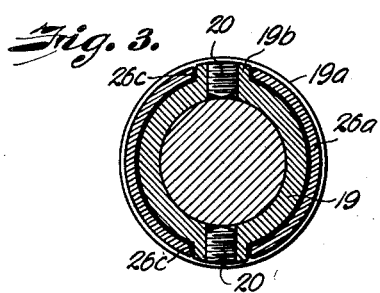
INVENTORS.
Charles W. Stratford
Herbert W. Stratford
BY
ATTORNEY.

Patented Sept. 13, 1949

2,481,888

UNITED STATES PATENT OFFICE 2,481,888

SHROUDED ROTARY SEAL

Charles W. Stratford and Herbert W. Stratford, Kansas City, Mo., assignors to Stratford Development Corporation, Kansas City, Mo., a corporation of Delaware Application June 10, 1944, Serial No. 539,628

2 Claims. (Cl. 286—11.15)

This invention relates to improvement in seals for rotating shafts and refers more particularly to seals adaptable for use on shafts rotating at high speed and under high pressure conditions and whose construction includes stationary and rotating parts which are self-aligning with the shaft axis as well as assemblies which assure lubricated fluid-tight conditions.

To meet the more exacting conditions of high speed and high pressure a seal surrounding a rotating shaft must have smooth fluid-tight contacting faces between the stationary and rotating parts and the faces should be maintained at all times normal with the shaft axis. Furthermore, a seal should prevent passage of fluid around the parts as well as migration of the fluid along the rotating shaft. The effectiveness of the construction of the instant seal can only be appreciated with the knowledge that the sealing or contacting faces of the stationary and rotating parts are maintained normal with the axis of the rotating shaft in terms of micro inch dimensions.

Heretofore it has been common practice to rigidly fix the stationary part of the sealing assembly in the machine housing or supporting structure relying upon the rotating part to accommodate itself to the contacting face of the stationary part during operation. The surfaces between the contacting faces of the stationary and rotating parts are machined to a degree of exactness that would assure the best possible seal. Small irregularities in either of the contacting faces or slight departures of the shaft axis from straight line rotation for any cause resulted in ruptures and leakage between the stationary and rotating parts of the seal.

The present construction aims to correct difficulties heretofore experienced by providing for self-alignment of the stationary and rotating parts of the seal with the axis of the shaft at all times. It also assures effective closure elements in the form of serrations between the parts which serve to prevent migration of the fluid around the parts and along the shaft.

A further advantage of the seal is the shrouding or enclosing of parts which rotate at high speed with the shaft thereby reducing to a minimum friction and heat developed by rotation of the parts in the surrounding fluid lubricant and the resultant power loss therefrom.

An additional feature of novelty is the manner in which the shaft bearing is mounted between the seals permitting adequate and effective lubrication, preventing exposure to diluent or corrosive fluids and providing accessibility and ease of assembly or disassembly.

In the accompanying drawings which form a part of the specification and are to be read in conjunction therewith and in which like reference numerals are used to indicate like parts in the various views there is shown one embodiment of the invention.

Fig. 1 is a center sectional view of a double seal utilizing the seal construction on opposite sides of a bearing, Fig. 2 is an enlarged view of that portion of the seal where the stationary insert and rotating portions have their contacting surfaces, and Fig. 3 is a view taken along the line 3—3 in Fig. 1.

Referring to the drawings, at 10 is shown a portion of the machine upon which the seal is to be used and in which is formed the seal housing 11 through which extends the shaft 12. Bolted to the machine 10 and forming the outer closure for the seal housing as well as a support for the bearing sleeve 13 is a member 14. The hollow space 15 within the member 14 corresponds to the chamber or housing 11 formed in the machine 10. These enclosures 11 and 15 are connected by a duct 16 and serve as a circulating space for the fluid lubricant which surrounds the bearings and seals. This lubricant is introduced through pipe 17 and is discharged through outlet 18 providing an adequate and clean supply of lubricant at all times to the seals and bearings.

Fixed to the shaft 12 is a driving sleeve comprising an internal cylindrical member 19 onto which is shrunk a bearing portion 19a. Extending longitudinally from the bearing portion on opposite sides of the shaft are dogs 19b. To fix the driving sleeve to the shaft set screws 20 extending through the driving sleeve seat against flattened portions on the periphery of the shaft. There is sufficient clearance between the O. D. of the shaft and the I. D. of the driving sleeve to permit its easy removal from the shaft when the set screws are backed off.

A flanged support ring 21 is held in the end of housing 11 by bolts 22. This ring has a fluid-tight engagement with the machine 10 by the seating of an annular serration 22a against a flange on the machine 10. Within the ring 21 and the flange 14a of member 14 are positioned stationary insert rings 24 hereinafter designated as inserts. These inserts seat against compressible gaskets 25 and have upon the faces abutting the gaskets circular serrations 24a. The gasket material upon which the ends of the stationary inserts seat may be of rubber, neoprene or any type of compressible material including asbestos compositions or ductile thin metal sheets such as copper, silver and lead. The serration formed in the end of the inserts may be either knife edged or rectangular in cross section according to the character of the gasket and the pressures to be confined.

The rotating assembly driven by the sleeve 19 is identical in both seals and comprises a seal ring 26 having an extension or shroud 26a overlapping the ends of the driving sleeve 19 and having engagement with the dogs 19b by cutout portions 26c into which the dogs fit. Between the ends of the driving sleeve and seal rings 26 and beneath shrouds 26a of the rings are enclosed coil springs 27 and compressible packing rings 28. Between the ends of the springs 27 and the packing rings are compression rings 29. Facing the surfaces of the packing rings adjacent the shaft and upon one surface of the packing rings extending radially from the shaft are reinforcement members shown in the form of angle rings 30. These reinforcement members or rings lying adjacent the abutting edges of the packing rings and the shaft furnish a sealing surface between the packing elements and the shaft as well as the packing elements and the sealing ring. To assure a seal joint between the abutting surfaces of the packing rings and the seal rings there is formed on the seal ring surfaces serrations 26b. Axial pressure imposed upon the packing rings by means of springs 27 seats the reinforcement or angle rings against the serrations of the seal rings causing them to bite into the surfaces of the abutting reinforcement members and form a pressure-tight closure between the two surfaces. This axial spring pressure is likewise transmitted through the resilient material of the packing rings to produce a fluid-tight seal between the reinforcement rings and the shaft. The character of the fluid against which seal is to be provided will determine the type of the material of the reinforcing rings. Ductile metal such as copper, silver and the like are adaptable for use with some fluids while others, due to their corrosive properties, require the use of synthetic plastic materials.

It will be noted that accessories and adjuncts to the seal assembly which are mounted upon the periphery of the shaft and extend radially therefrom are completely enclosed and surrounded by a smooth housing in the form of the shroud portion 26a of the seal rings, thus friction and resistance resulting from the high rotative speed of the assembly within the oil-filled enclosures is reduced to a minimum. A shaft rotating at high speed, with the seal parts such as springs, multiple pins and supports exposed, rapidly agitates the lubricant and produces objectionable heat and would render the lubricant relatively ineffective.

The contacting faces of the stationary inserts 24 and rotating seal rings 26 are preferably reduced to mirror-like surfaces or "Superfinish" which amounts to substantially optical flatness, providing a fluid-tight seal at their contacting surfaces. In other words, the seal at the contacting surfaces preferably involves terms of micro inch dimensions with respect to flatness and its being normal to the axis of the rotating shaft. Furthermore, it is the intended purpose of the construction of the seal assembly to maintain this normalcy with the axis of the shaft at all times during the shaft's rotation. To effect this purpose clearance is provided between the inserts and the shaft and the inserts and the enclosing housing structure. Likewise, clearance is provided between the seal rings and the shaft and between the shrouds of the seal rings and the driving sleeve. Thus, when axial pressure is imposed by the springs 27 against the packing rings, and through the packing rings to the seal rings and inserts, alignment of the seal rings and inserts with the shaft axis is assured. This results from the fact that the inserts seat against flexible gaskets on narrow circular serrations located on their end faces and have freedom of movement laterally within the housings which surround them. Clearance between the shaft and the seal rings permits the seal rings to accommodate themselves to the position of the inserts so that the inserts and seal rings are kept automatically in alignment with the axis of the shaft at all times by axial pressure of the springs 27.

Migration of fluid around the inserts is prevented by the pressuretight closure formed by seating of the insert serrations in the flexible gaskets. Likewise, passage of fluid around the outside of the packing rings is prevented by the serration on the inner radial surface of the seal rings which is pressed into the reinforcement on the abutting surface of the packing rings.

While there has been shown and described a double seal arranged on opposite sides of a bearing with facilities provided for oil circulation around the bearings and seal assembly, it is contemplated as well that a single seal may be used incorporating the construction and features described.

The importance of maintaining the sealing elements in alignment with the shaft axis is best appreciated where the seal is adapted for use with a relatively small shaft operating at high speeds. Whipping of the shaft under these circumstances and periodic or vibratory disturbances of any kind cause the axis of the shaft to depart, during its rotation, from a straight line. Such oscillations will disturb and break the closure between the contacting faces of the seal if alignment of the stationary and rotating parts is not automatically maintained. As an example, seals in vapor contactors were operated at speeds in excess of 13,000 R. P. M. with relatively perfect results in practically completely shutting off passage of fluid through the seal surfaces even when relatively high oil pressures were used within the seal housing.

Besides the automatic self-aligning characteristics of the seal, an advantage not found in ordinary seals where the stationary part or insert is fixed within the housing, there is the additional advantages of enclosing the rotating parts to reduce friction and production of heat and the finishing of the contacting surfaces to substantially optical flatness to obtain a fluid-tight joint between the stationary and rotating surfaces.

Merit is also found in the design of the seal and bearing assembly wherein the bearing is positioned between the seals instead of within the body of the machine. By locating the bearing outside of the machine it is removed from exposure to diluent or corrosive fluids and may be easily and effectively lubricated.

In regard to the material used in the packing elements or rings 28 resilient substances such as rubber or rubber compounds, both natural or synthetic, rectangular in cross section and faced with reinforcement rings 30 of ductile material such as copper, aluminum or silver having a thickness of .010 inch to .015 inch or a shrouding made of synthetic plastic material which have sufficient strength and are resistant to the fluids to be sealed have proved satisfactory.

In addition to the axial pressure imposed by the springs 27 upon the sealing rings and inserts, fluid pressure of the liquid within the housing surrounding the seals likewise imposes heavy pressure upon the flexible gaskets against which the inserts are seated and compresses the resilient material of the packing rings to assure pressure-tight seal against the shaft and sealing rings.

From the foregoing, it will be seen that the invention is well adapted to attain all of the ends and objects hereinbefore set forth together with other advantages which are obvious and which are inherent to the structure.

As many possible embodiments may be made of the invention without departing from the scope thereof, it is understood that all matter herein set forth or shown in the accompanying drawings is to be interpreted as illustrative and not in a limiting sense.

Having thus described our invention, we claim:

1. A seal assembly for a rotating shaft including a stationary insert and a rotating seal ring having contacting faces normal with the axis of the shaft, spring means and a flexible packing element on the opposite side of the seal ring from the insert all enclosed within the housing and coacting to maintain a seal at the contacting faces of the insert and seal ring, a reinforcement ring of more resistant material than the composition of the packing element facing the surfaces of said packing element adjacent the shaft and seal ring, an annular knife edge ridge at one end of the insert between the insert and housing adapted to automatically align the seal assembly with the axis of the rotating shaft and a second annular knife edge sealing ridge between the seal ring and the ring of resistant material facing the packing element.

2. A seal assembly for a rotating shaft including a stationary insert and a rotating seal ring having contacting faces normal with the axis of the shaft, spring means and a flexible packing element on the opposite side of the seal ring from the insert all enclosed within a housing and coacting to maintain a seal at the contacting faces of the insert and seal ring, a reinforcement ring of more resistant material than the composition of the packing element facing the surfaecs of said packing element adjacent the shaft and seal ring, a shroud portion on the seal ring enclosing the spring means and reinforced packing element, an annular knife edge ridge at one end of the insert between the insert and housing adapted to automatically align the seal assembly with the axis of the rotating shaft and a second annular knife edge sealing ridge between the seal ring and reinforced packing element.

CHARLES W. STRATFORD.
HERBERT W. STRATFORD.

REFERENCES CITED

The following references are of record in the file of this patent:

UNITED STATES PATENTS

| Number | Name | Date |
|---|---|---|
| 882,690 | Jones | Mar. 24, 1908 |
| 906,199 | Coleman | Dec. 8, 1908 |
| 1,293,667 | Bandman | Feb. 11, 1919 |
| 1,900,849 | Ackerman | Mar. 7, 1933 |
| 1,958,246 | Olson | May 8, 1934 |
| 2,094,160 | Oldberg | Sept. 28, 1937 |
| 2,149,975 | McCormack | Mar. 7, 1939 |
| 2,203,525 | Dupree | June 4, 1940 |
| 2,395,705 | Wool | Feb. 26, 1946 |

FOREIGN PATENTS

| Number | Country | Date |
|---|---|---|
| 118,060 | Switzerland | 1927 |